Aug. 6, 1940.  T. M. HARVEY  2,210,454
APPARATUS FOR TAKING OF CINEMATOGRAPH IMAGES
Filed Feb. 11, 1939  12 Sheets-Sheet 1

Aug. 6, 1940.　　　T. M. HARVEY　　　2,210,454
APPARATUS FOR TAKING OF CINEMATOGRAPH IMAGES
Filed Feb. 11, 1939　　　12 Sheets-Sheet 6
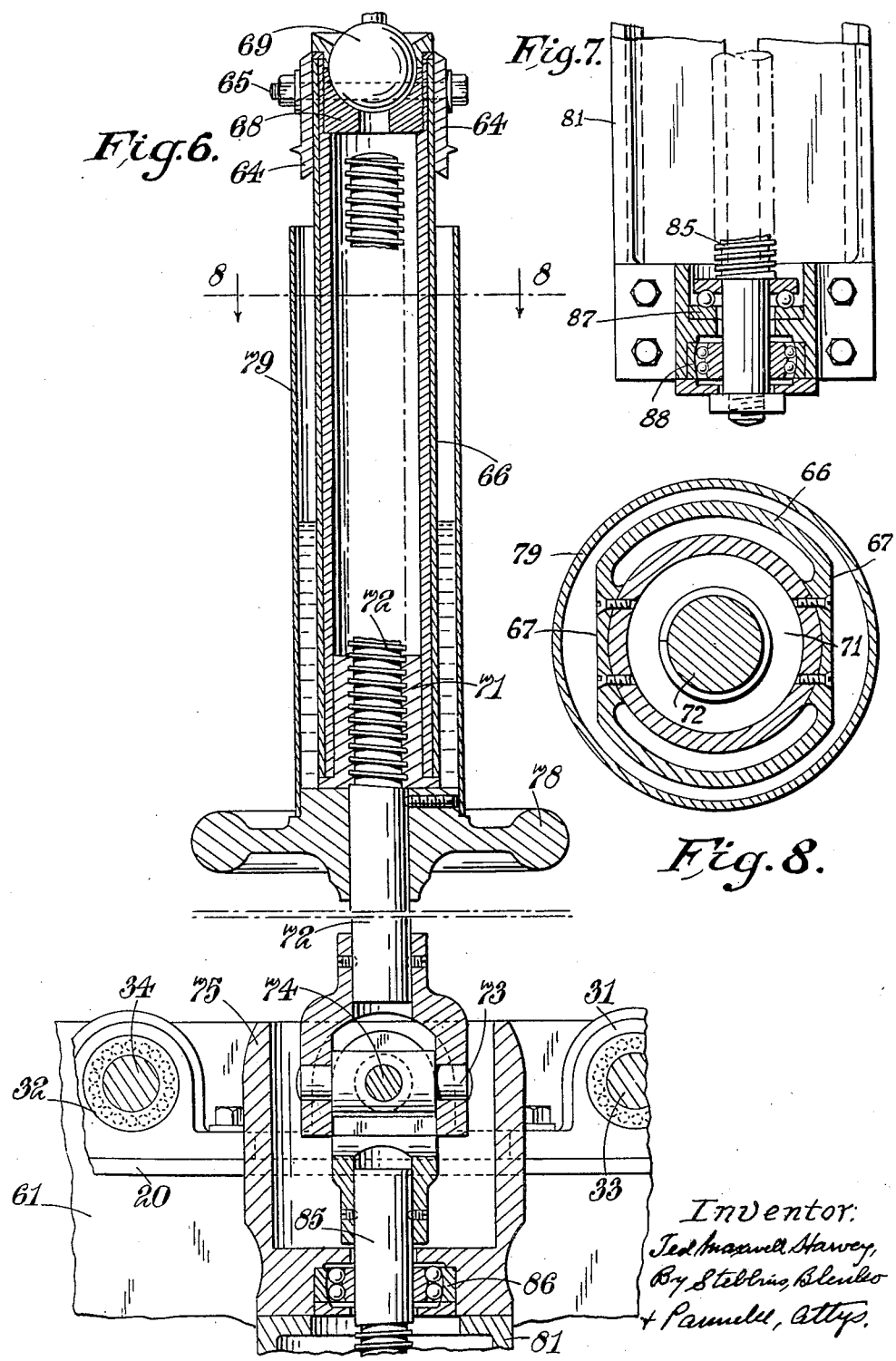

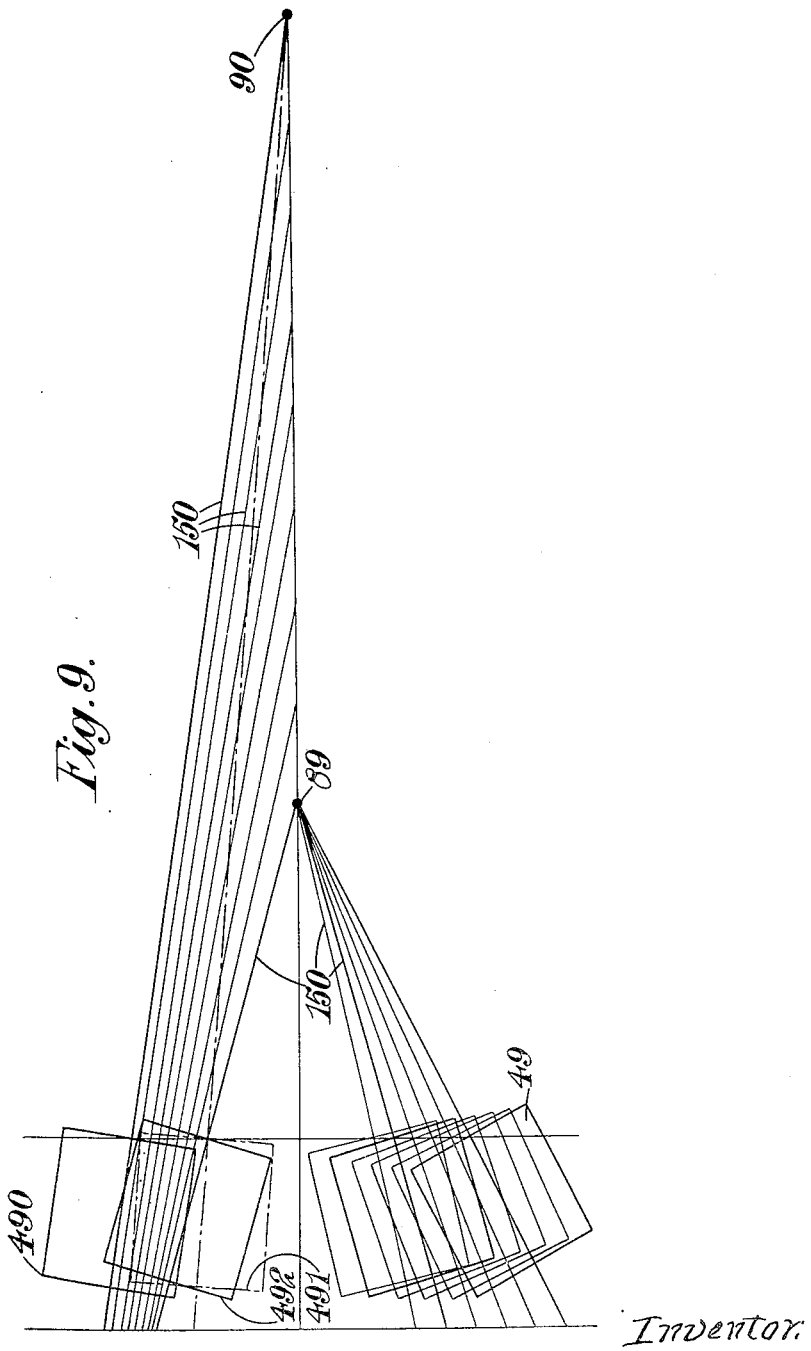

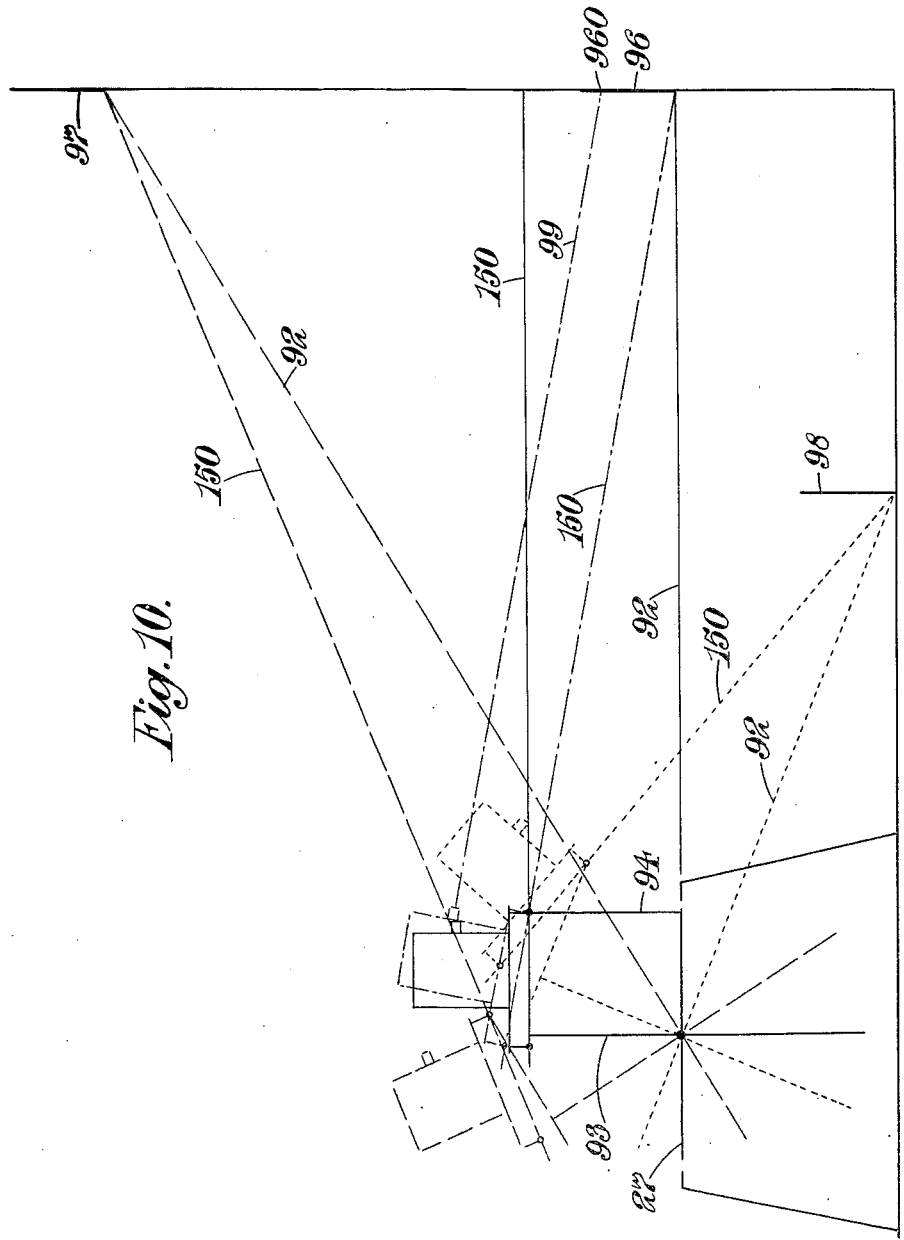

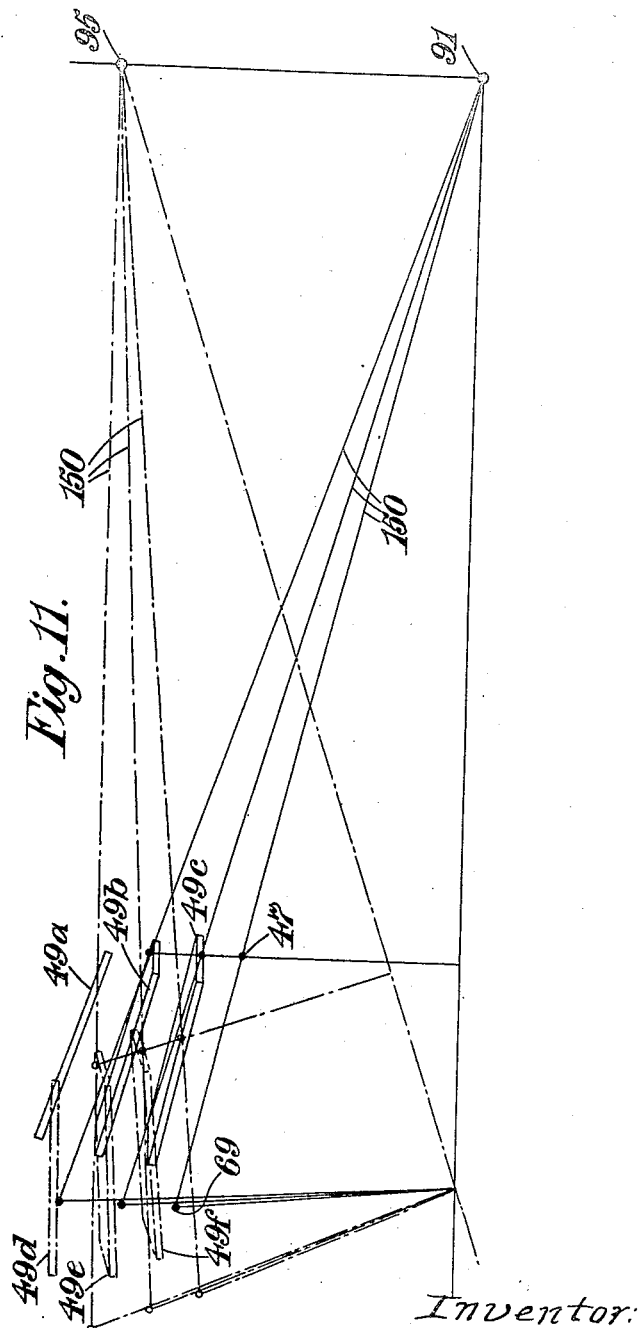

Aug. 6, 1940.   T. M. HARVEY   2,210,454
APPARATUS FOR TAKING OF CINEMATOGRAPH IMAGES
Filed Feb. 11, 1939   12 Sheets-Sheet 11
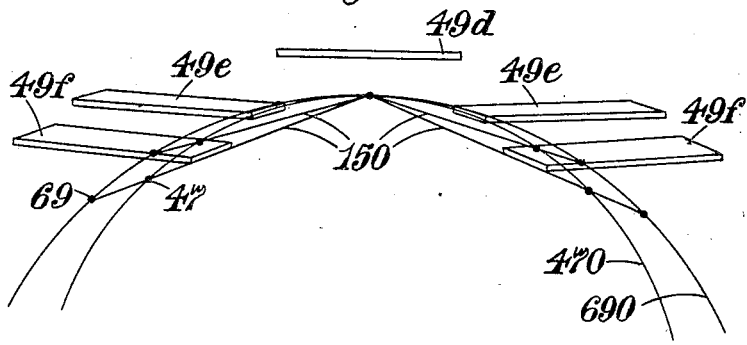
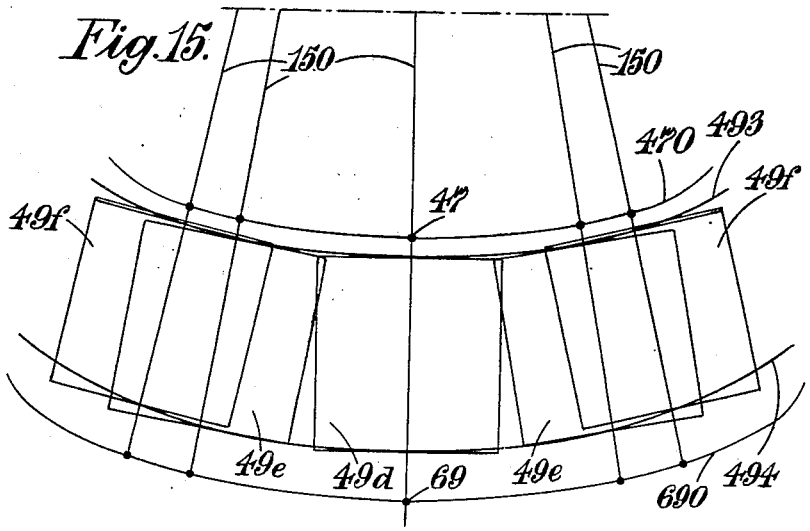

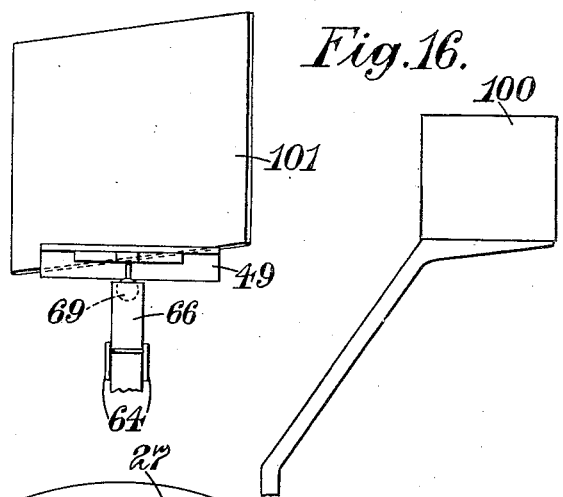
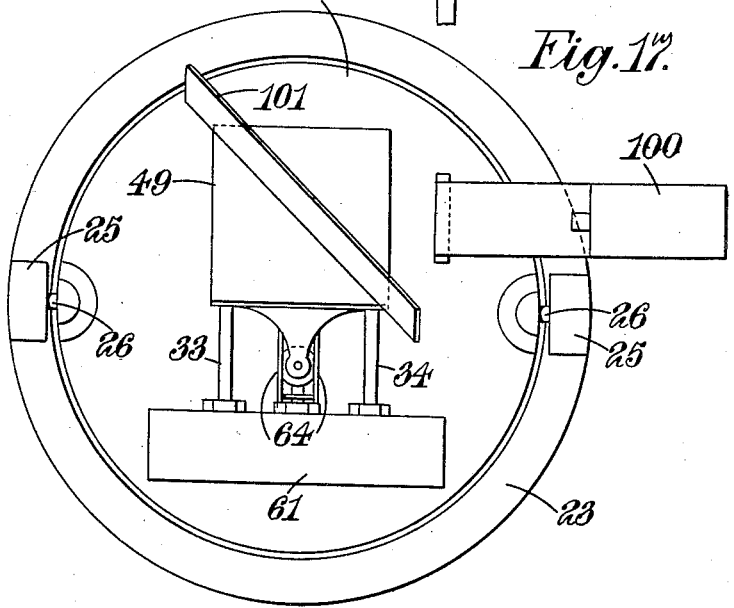
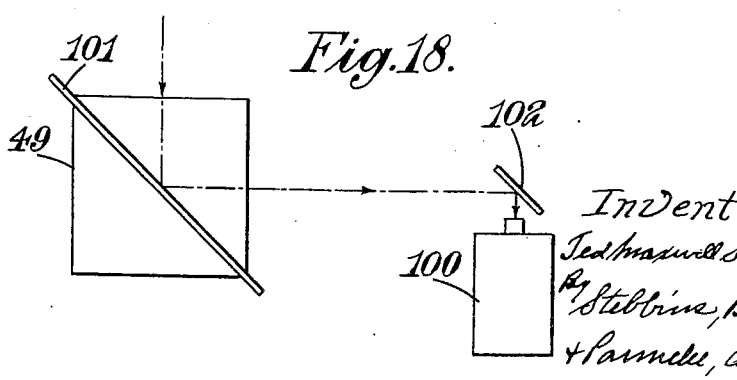

Patented Aug. 6, 1940

2,210,454

UNITED STATES PATENT OFFICE 2,210,454

APPARATUS FOR TAKING CINEMATOGRAPH IMAGES

Ted Maxwell Harvey, London, England

Application February 11, 1939, Serial No. 255,943
In Great Britain February 24, 1938

16 Claims. (Cl. 88—16)

This invention is for improvements in or relating to the taking of cinematograph images, and has for one of its objects to enable pictures to be obtained which shall be similar to the impression obtained by direct visual observation, in particular in so far as the apparent movements of objects in relation to one another as seen when the observer is walking or balancing his head, the thickness of the objects viewed, and the distance between objects at different distances from the view point are concerned.

Another object of the invention is to facilitate the making of adjustments to the apparatus by the operator during the progress of the exposure, such adjustments being necessary when the distance between the apparatus and the objects photographed changes.

Another object of the invention is to provide a construction of apparatus which shall not be subject to undesired movement such as shaking or vibration.

A further object of the invention is to provide a finely balanced apparatus. It will be appreciated that in order that the apparatus may work smoothly at any desired speed it is necessary that a very fine degree of balancing should be achieved. Merely to balance the parts for one setting thereof would in some circumstances not be sufficiently accurate, and it will be seen that the invention provides automatic adjustment in the balancing corresponding to changes in the setting of the parts.

For a more complete understanding of the invention there will now be described, by way of example only and with reference to the accompanying drawings, certain constructional forms of apparatus according to the present invention. It is to be understood, however, that the invention is not restricted to the precise constructional details set forth.

In these drawings:

Figure 6 is a detail vertical section on the line 6—6 of Figure 3;

Figure 7 is a detail vertical section on the line 7—7 of Figure 3;

Figure 8 is a detail horizontal section on the line 8—8 of Figure 6;

Figure 9 is a composite diagrammatic plan view showing the movements of the camera or reflector table during the photography of an object moving towards or from the camera. In this figure the axis of oscillation is assumed to be horizontal;

Figure 10 is a diagrammatic side elevation showing the way in which the apparatus is set for photographing objects at different distances and levels;

Figure 11 is a diagrammatic side elevation showing in full lines the movements of the table during the photography of a stationary object at a level such that the axis of oscillation is horizontal, and in chain lines the movements of the table during the photography of a stationary object at a higher level;

Figure 14 is a diagrammatic end elevation corresponding to the part of Figure 11 which is in chain lines;

Figure 15 is a diagrammatic plan view corresponding to the part of Figure 11 which is in chain lines;

Figure 16 is a fragmentary elevation showing a modified form of apparatus;

Figure 17 is a fragmentary plan view of the parts shown in Figure 16 and of certain associated parts, and Figure 18 is a diagrammatic plan view of another construction of apparatus according to the present invention.

Like reference numerals indicate parts throughout the drawings.

Figure 1:
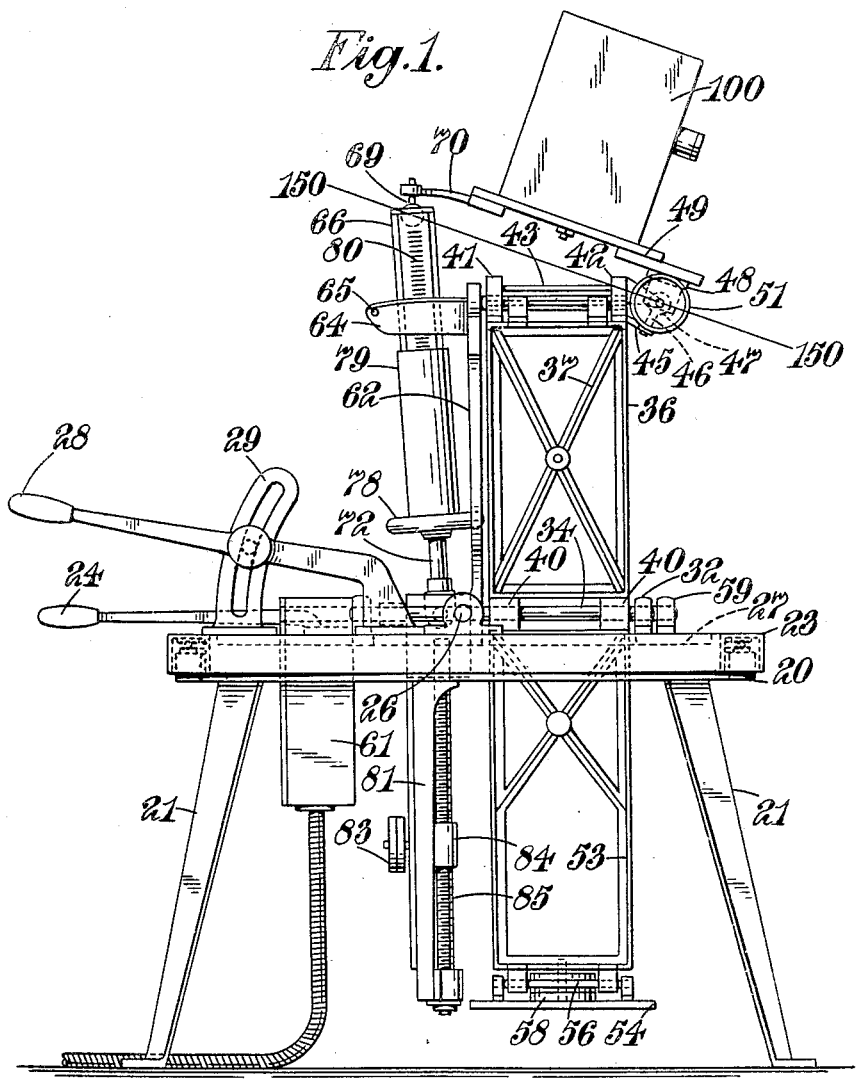
Figure 1 is a side elevation of one form of apparatus according to the invention.
Figure 2:
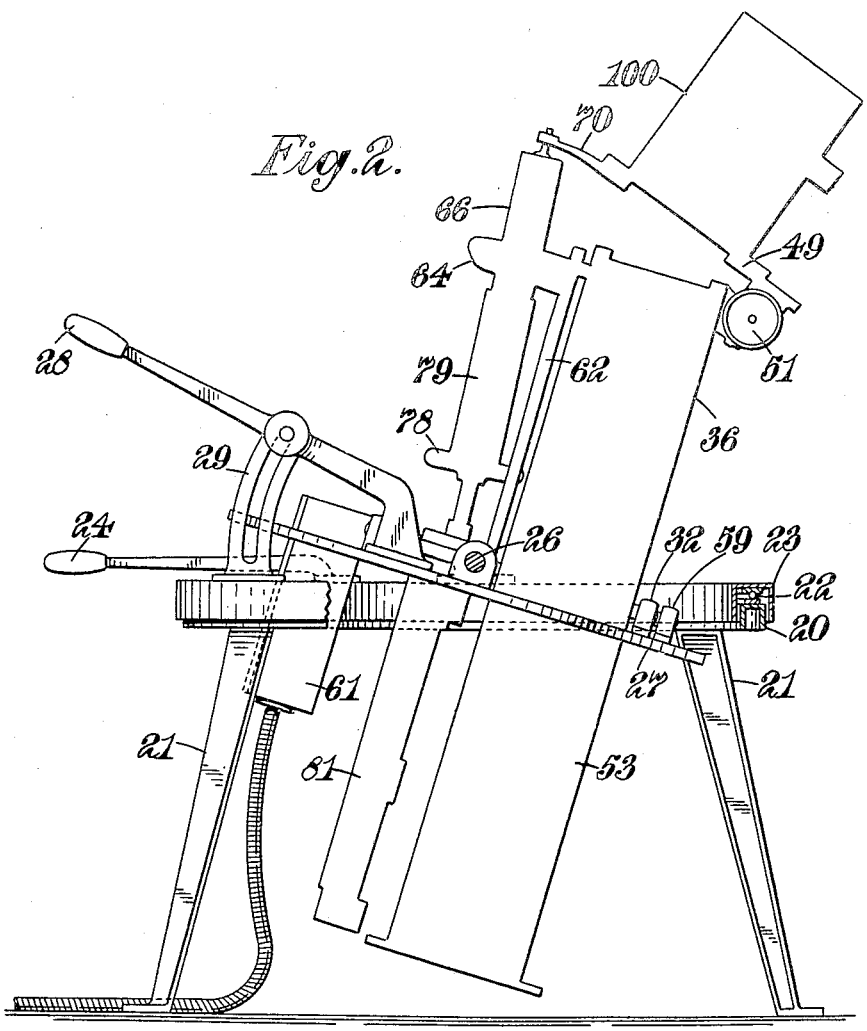
Figure 2 is a view corresponding to Figure 1, but showing the parts in a different setting from that of Figure 1, and also showing certain of the parts only in outline.

According to the present invention, there is provided apparatus for taking cinematograph images, comprising a table for supporting the receiving member for the image-forming rays passing to the camera, and a composite oscillatable mounting for said table adapted to permit the forward tilt of the table to be altered to angles appropriate to the distance between the apparatus and the object photographed, and adapted to oscillate the table bodily through an arc about an axis while maintaining the optic directional line of the table intersecting the said axis of oscillation at a fixed location which is the location of the objects photographed, which mounting comprises two pillars spaced apart along the said axis of oscillation and each connected to the table by a universal joint, one of which pillars is a "parallel motion" articulated parallelogram which prevents sideways tilting of the table during the oscillation through the said arc, and which mounting supports the table by universal joints on two pillars, one of which pillars is nearer to the object to be photographed than is the other when the apparatus is in use, and the operative length of one of which pillars is adjustable relatively to the other to effect the aforesaid change in the forward tilt of the table by forming the adjustable pillar of two elements movable endwise the one relatively to the other and interconnected throughout the adjustment by means which themselves maintain the pillar operative to support the table during the progress of the adjustment, and enable the operator to alter, during the oscillation of the mounting, the forward tilt of the table to angles appropriate to the distances between the apparatus and the objects photographed. The said receiving member imageforming rays passing to the camera may be the lens of the camera (in which case the camera would itself be mounted upon the table) or it may be a reflector intended to co-operate with the camera.

It may be here explained that "parallax" lines are sight lines or lines of direction culminating or intersecting at a point or apex at which is situated the object being photographed. The phrase "parallax of the table," may be used to describe the angles formed during the operation of the apparatus according to the invention, by the line which passes through the centres of the two universal joints and intersects the axis of oscillation at the location of the object being photographed. This line, referred to herein as the optic directional line of the table, is parallel to, but below, the camera axis, or the corresponding axis in the case of a reflector, since the perpendicular distances between the plane of the table and the centres of the two universal joints are equal, as will be noted hereinafter. It therefore follows that if the optic directional line of the table intersects the axis of oscillation at the base of an object, the camera axis, or the corresponding axis in the case of a reflector, will be directed upon a point higher than the base of that object.

It will be appreciated that an observer very seldom, if ever, sees objects from a perfectly still position as the head in the act of balancing has a natural swing and in walking this natural swing is greatly increased and produces on the eye the effect of motion. All objects except the one on which sight is fixed appear to have motion with relation to that object. The apparatus according to the present invention enables the effects of this said natural motion to be reproduced on a cinematograph screen since a continuous series of photographs can be taken from positions along the aforesaid arc while maintaining the camera focussed on a selected object showing the apparently fixed position of that object and the apparent motion of other objects in relation to the said chosen object. The parallax of the table is in a sense the equivalent of the parallax of human vision and will enable that parallax to be maintained during the progress of the photography of still or moving objects, and therefore the picture obtained instead of appearing flat will have atmosphere, i. e. will give the impression of natural motion, height, breadth, depth and distance. Although a "parallel motion" articulated parallelogram is employed it should be explained that unless the object to be photographed is at infinite distance the table does not move in parallel planes during the oscillation, but on the contrary its forward tilt is continually changing in order to maintain the optic directional line of the table intersecting the axis of oscillation at the location of the object photographed. The table and therefore the camera or reflector upon it also has to turn or skew for the same reason. In cinematography, the object upon which the camera is to be focussed seldom remains at a constant distance from the camera, and it is therefore necessary to provide for the aforesaid adjustment of the apparatus which is requisite to take care of this, such adjustment involving alteration in the forward tilt of the table so that the optic directional line of the table may be directed towards selected objects at any distance from the apparatus. This alteration in the forward tilt of the table is necessary in addition to the ordinary focussing of the camera lenses. Since, as stated above, the forward tilt of the table is adjusted, according to the present invention, by the relative movement of the two elements of a table-supporting pillar, which two elements are interconnected throughout the adjustment by means which themselves maintain the pillar operative to support the table during the progress of the adjustment, such adjustment can be carried out during the progress of the exposure. This adjustment is essential in cinematography, and would not be feasible if the table were supported at one end by a slotted pillar in which a block on the table slides freely but can be clamped in a selected position, because in such a construction the table would have to be supported by the operator when the block was unclamped from the slotted pillar. This would in practice entail that the progress of the exposure would have to be discontinued while the adjustment was being effected. In other words, because the slotted pillar would not be operative to support the table during the progress of the adjustment, such a construction would not be suitable for use in the conditions which usually obtain in cinematography, namely with the objects photographed changing their distances from the camera during the progress of the exposure.

As stated above, both pillars support the table by universal joints; the invention also provides additional bearing elements, such as rollers, one on each side of one of the universal joints, which additional bearing elements are shaped to maintain contact with the table during alteration in the forward tilt of the latter. Since these additional bearing elements are situated one on each side of one of the universal joints they will operate to prevent what has been called above "sideways tilting" of the table which the universal joint would otherwise permit. This "sideways tilting" would cause the sides of the unit pictures on the film to change their relation to the vertical to an undesirable extent.

Figure 3:
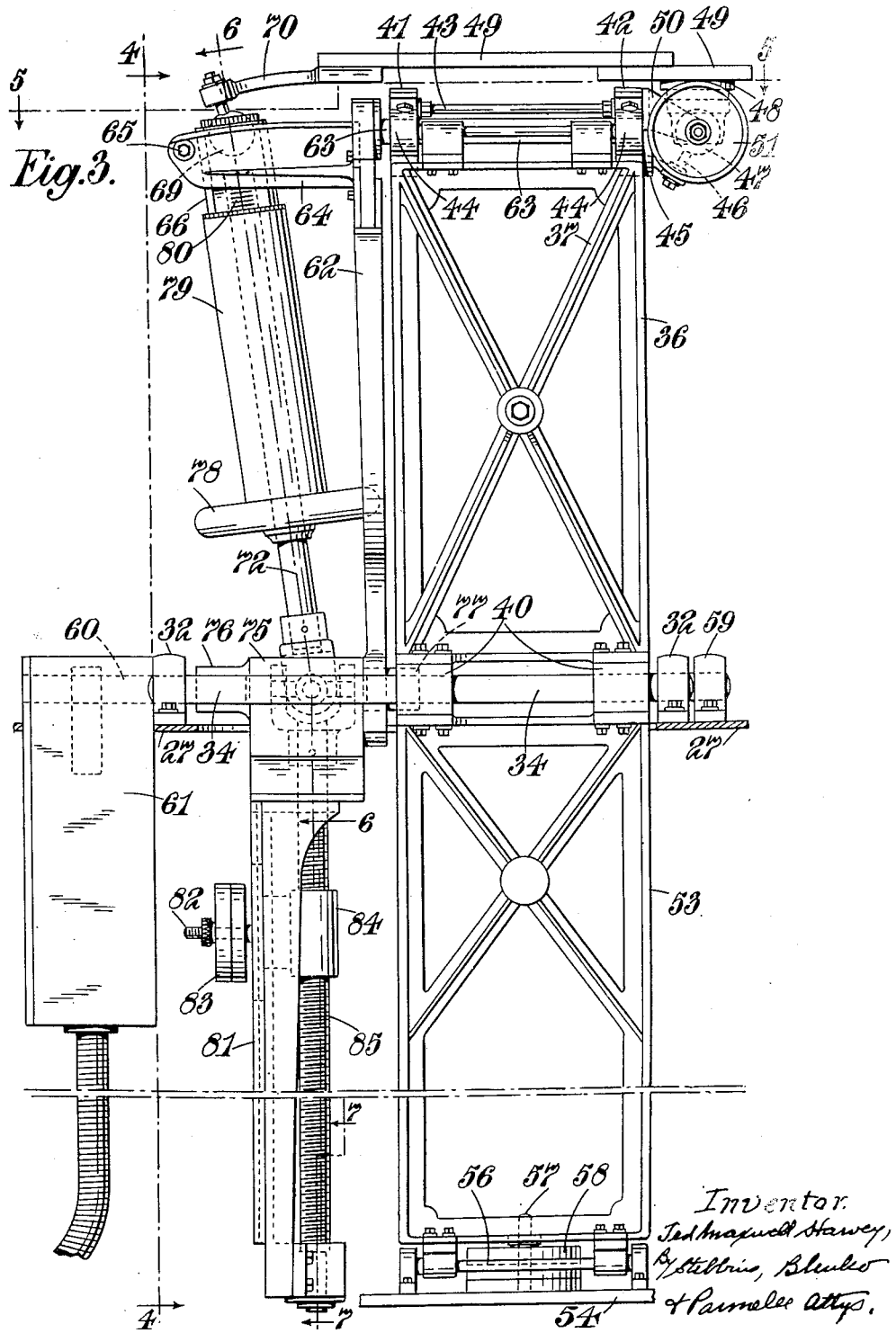
Figure 3 is a detailed view showing in side elevation certain of the parts shown in Figure 1, but on a scale larger than that of Figure 1. In this figure the apparatus is set differently from the settings shown in Figures 1 and 2.
Figure 4:
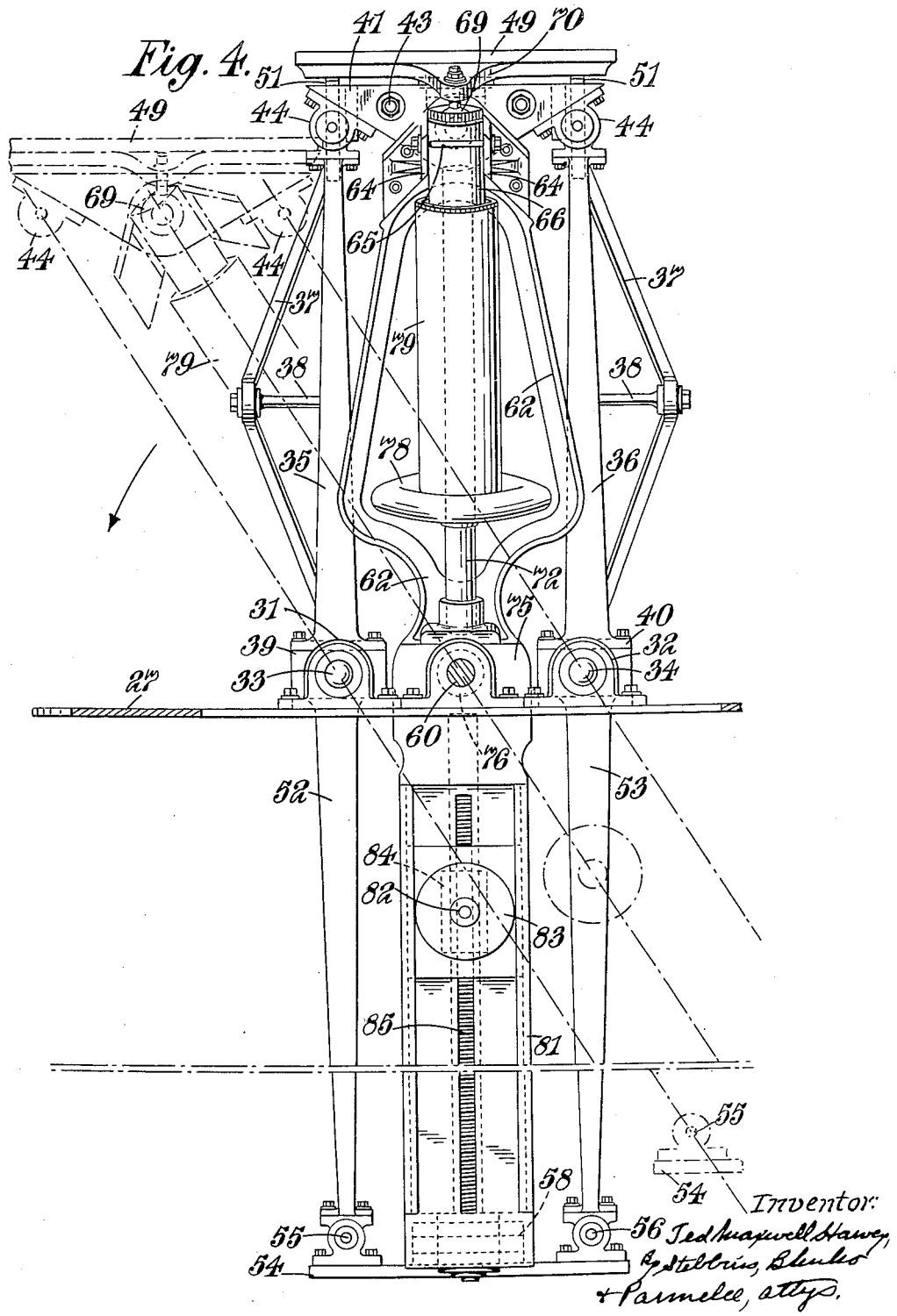
Figure 4 is a vertical section on the line 4—4 of Figure 3 and shows in chain lines one of the positions of the parts during the oscillation.
Figure 5:
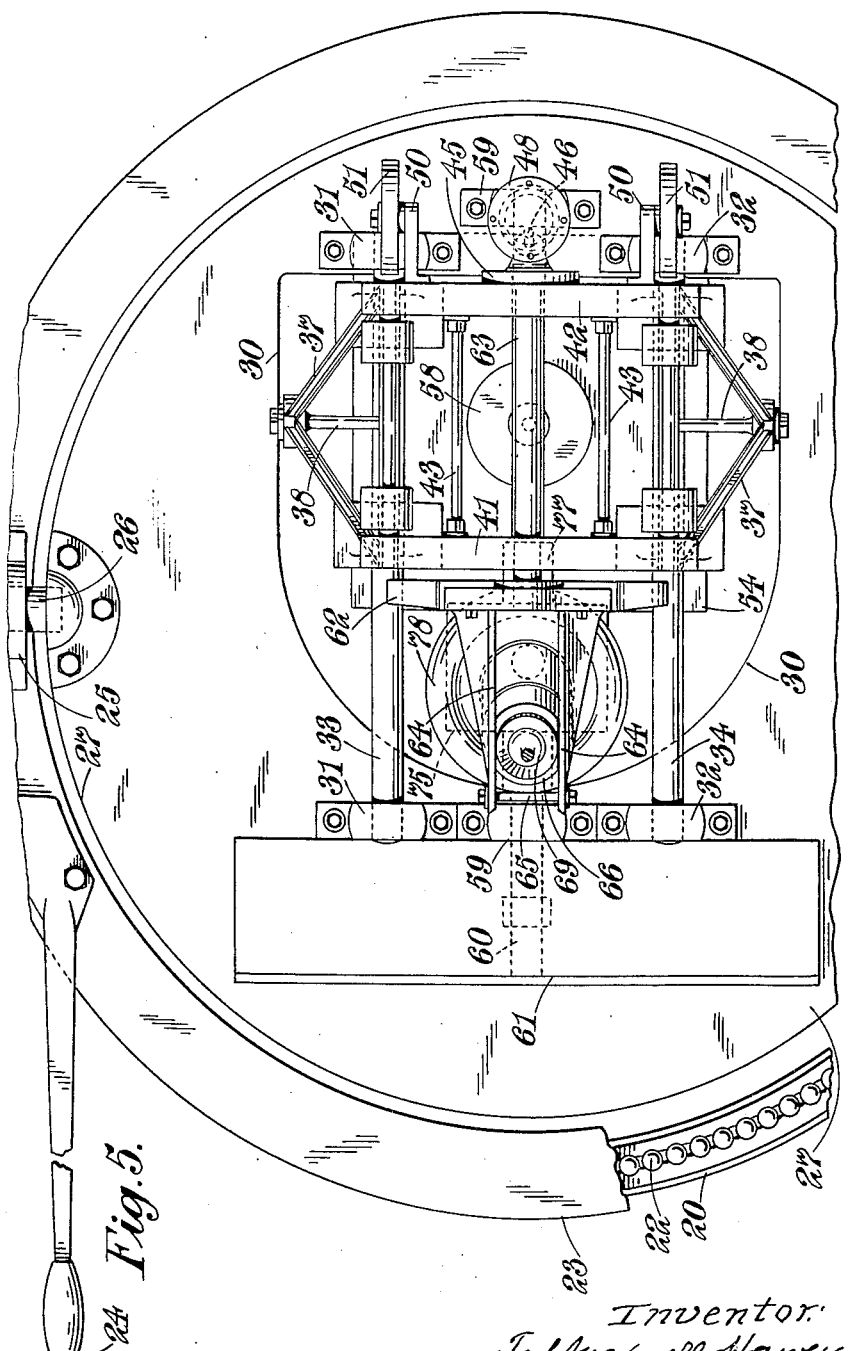
Figure 5 is a horizontal section on the line 5—5 of Figure 3.

Referring now to Figures 1 to 8, the construction of apparatus therein shown comprises an annular platform 20 mounted upon legs 21. Supported on the platform 20 by an anti-friction bearing 22 is a second annulus 23 having a handle 24 whereby the operator may turn it horizontally on the bearing 22. The annulus 23 has diametrically arranged trunnion bearings 25 in which are received trunnions 26 projecting radially from a circular plate 27 which is nearly as large as the internal diameter of the annulus 23. This plate 27 can be tilted in the trunnion bearings by means of a handle 28; it can be actuated during exposure. In any chosen position it can be locked to an arcuately slotted bracket 29 upstanding from the annulus 23. An aperture 30 is formed in the center portion of the plate 27, and pairs of bearings 31 and 32 are carried on the plate 27 on opposite sides of the aperture 30. These bearings 31 and 32 receive shafts 33 and 34 respectively on which the aforesaid articulated parallelogram is mounted. This parallelogram has two sides 35 and 36, each of which, as will be seen from Figures 3 and 4, is of general rectangular shape with the bracing members 37 extending from the corners of the rectangle and meeting at the outer ends of central struts 38. The outer ends of the strut 38 which receive the bracing members 37 are located on the outside of the planes of the rectangular frameworks, thus creating pyramidal formations. The inner ends of the struts 38 lie in the planes of the respective rectangular frameworks 35 and 36, being connected to other bracing members, not shown. Each parallelogram side 35 and 36 has two bearings 39 and 40 respectively for the reception of the shafts 33 and 34. The bearings in each pair 39 and 40 are situated as far apart as possible within the limits of the rectangular framework. Since the two parallelogram sides 35 and 36 are mounted in bearings on the plate 27, which bearings are at fixed distances from each other, the bottom of the parallelogram can be regarded as being constituted by the plate 27 and the said bearings thereon. The top of the parallelogram is constituted by a built-up framework consisting of two end plates 41 and 42 of triangular shape set vertically with their apices depending, and connected together by tie-bars 43. The sloping faces of the triangular plates 41 and 42 carry bearings 44 for pivotal connection with the parallelogram sides 35 and 36, each plate 41 and 42 having pivotal connection with both of the said sides. The triangular plate 42 carries midway between its ends a bracket 45 having a rod 46 which, as will be seen from Figure 3, is directed obliquely upwardly and outwardly. This rod 46 has on its upper end a ball 47 which forms part of a ball and socket joint. The socket 48 for the ball 47 is carried on the underface of, and therefore may be regarded as forming a part of, a table 49 upon which the receiving member for the image-forming rays passing to the camera (the camera or the aforesaid reflector) is to be supported. At each side of the bracket 45, the triangular plate 42 also has other brackets 50 affording bearings for two rollers 51 the axes of which are aligned with each other and with the axis of the ball 47. The rollers 51 are of such diameter as to maintain contact with the underface of the table 49 as the latter is tilted forwardly about the axis of the ball 47 and the rollers 51.

For the purpose of balancing, the parallelogram sides 35 and 36 have downward continuations 52 and 53 reaching through the aperture 30 in the plate 27, and the lower ends of these continuations or extensions 52 and 53 are connected together by a cross-member in the form of a plate 54 which is pivoted to the members 52 and 53 by shafts 55 and 56 respectively and which is adapted to receive upon an upstanding pin 57, balance weights 58, of which any suitable number may be employed. As will be seen from Figures 1 and 3, the members 52 and 53 are of braced construction.

Midway between the two shafts 33 and 34 on which the parallelogram sides are carried, there is mounted on bearings 59 on the plate 27, a third shaft 60. An oscillating movement in these bearings 59 is imparted to the shaft 60 by mechanism which does not form part of the present invention and which is assumed to be enclosed within the casing 61. This said mechanism includes a clutch or the like whereby it may be disconnected so as to permit the parallelogram to be oscillated manually. The shaft 60 is in the same plane as the shafts 33 and 34 and is parallel to them. The shaft 60 is not a continuous entity but is in two endwise aligned lengths which are connected together in a manner which will be described later. Carried by, through not directly mounted upon, the shaft 60 is a bracket 62 which oscillates with the shaft 60 and reaches upwardly close to the parallelogram sides 35 and 36, on the side thereof at which is located the triangular plate 41. Near its upper end the bracket 62 is bolted to a rod 63 which reaches through and is rotatably secured in the two triangular plates 41 and 42 at a position midway of the length of said plates. In this way the bracket 62 and the articulated parallelogram are connected together to oscillate as one entity. Reaching from the upper end of the bracket 62 are two opposed jaws 64 which are tied together at their outer ends by a bolt 65 and have their opposed faces flat, vertically disposed and parallel. Received between the jaws 64 is the upper end of a sleeve 66 which has flattened faces 67 to make sliding contact with the faces of the jaws 64. At its upper end the sleeve 66 carries a ball socket 68 in which is received a ball 69 projecting downwardly from a projection 70 on the underface of the table 49. This ball 69 may be regarded as forming part of the table 49. The perpendicular distance between the plane of the table 49 and the centres of the two balls 47 and 69 is the same. The jaws 64 are so placed that in its sliding movement along them, the upper end of the sleeve 66 will cause the ball 69 to move in a plane at right angles to the axis of the ball 47 and rollers 51 at the other end of the table and passing through the axis of the ball 47. The sleeve 66 reaches downwardly towards the plate 27 and carries at its lower end an internal nut 71 which is received upon a screwed rod 72. This rod 72 has a universal joint whereof the two hinge pins are shown at 73 and 74 in Figure 6. The point of intersection of the axes of these two pins lies on the axis of the two-part shaft 60 mentioned above. The universal joint members 73 and 74 are surrounded by a shell 75 which, as seen in Figure 3, has two lateral bushes 76 and 77 in the bores of which the two portions of the shaft 60 are received and secured. Thus the shell 75 ensures that the two portions of the shaft 60 will oscillate together. The bracket 62, as will be seen from Figure 3, is mounted upon the outside of the bush 77 and is secured to the shell 75. The universal joint members 73, 74 permit the upper end of the sleeve 66 to slide between the jaws 64 while the rod 72 rotates. As illustrated, the dimensions and arrangement of the parts of the apparatus are such that a line drawn between the centre of the universal joint 73, 74 and the centre of the ball 69 lies at an angle of about 7.5° to the plane of oscillation of the articulated parallelogram when the table 49 is set for the photography of objects at infinite distance.

Fixed to the rod 72 immediately below the lower end of the sleeve 66 is a handwheel 78 whereby the rod 72 may be rotated by the operator. This rotation will adjust the sleeve 66 lengthwise of the rod 72 and therefore alter the distance between the ball 69 and the shaft 60. In consequence the forward tilt of the table 49 will be changed and by reason of the connection between the table 49 and the upper end of the sleeve 66, the latter will slide in the jaws 64 towards or away from the upper end of the bracket 62. This sliding movement only occurs when the handwheel 78 is turned, and does not occur during the oscillation of the parts if the handwheel 78 is not operated.

Projecting upwardly from the handwheel 78 is a second sleeve 79 which surrounds the sleeve 66 and can be adapted to serve as an oil bath. Its upper edge can also be used as an indicator to be read in conjunction with a scale 80 (see Figure 1) on the exterior of the sleeve 66. Conveniently this scale 80 is graduated in terms of the distance between the apparatus and the object to be photographed. This graduation is further described below in conection with Figure 10.

For balancing purposes the bracket 62 has a downward extension 81 below the aperture 30 in the plate 27, and to provide for a correction in balancing due to the different degrees of forward tilting of the table 49, the extension 81 is formed as a slideway for a member carrying a screwed pin 82. Balance weights 83 are mounted upon the pin 82 which is carried by a nut 84 received upon a downward extension 85 of the rod 72. This extension 85 is received at its upper end in a bearing 86 in the base of the shell 75 and is received at its lower end in bearings 87 and 88 at the lower end of the extension 81 of the bracket 62. It will be understood that the screwed rods 72 and 85 are connected together by the universal joint 73, 74 aforesaid and that the extension 81 of the bracket 62 is secured to the lower part of the shell 75. Rotation of the handwheel 78 to change the setting of the table 49 will rotate the screwed rods 72 and 85 and correspondingly change the position of the balance weights 83 with respect to the axis of the shaft 60.

Figure 12:
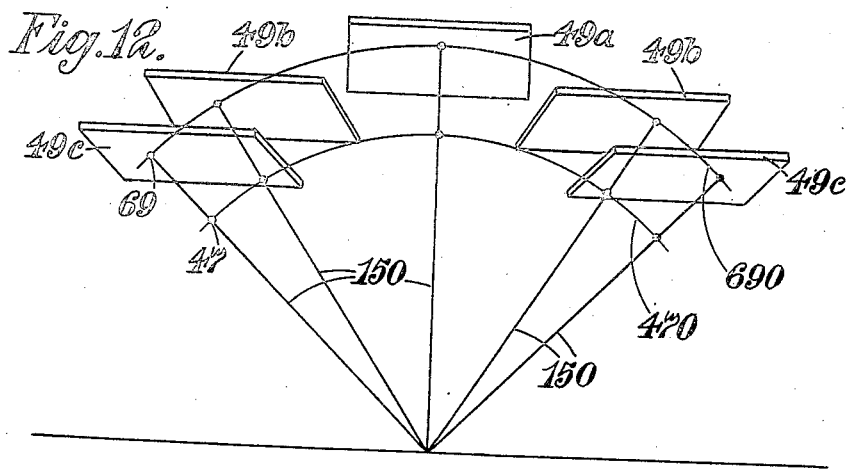
Figure 12 is a diagrammatic end elevation corresponding to the part of Figure 11 which is in full lines.

From the foregoing it will be appreciated that during the progress of the exposure, the articulated parallelogram and the pillar constituted by the sleeve 66 and rod 72 will oscillate the table 49 about the axes of the shafts 33, 34 and 60. The optic directional line of the table 49 is shown in Figure 1 by the line 150—150, this line passing through the centres of the balls 47 and 69. The radius of the arc through which the table 49 is oscillated by the articulated parallelogram may conveniently be about 22 inches and the angle of oscillation may conveniently be about 90° in all, but it will be understood that these details may be varied as desired. The time taken for movement from one extremity of the arc to the other extremity may be varied by the mechanism on the casing 61. In some circumstances a suitable time is sixteen seconds. The number of film exposures per second may also be varied according to circumstances. In some conditions a suitable number is twenty-four exposures per second. The oscillation will ensure that the photographs obtained will be similar to the impressions obtained by direct visual observation. Continuously during the oscillation, the forward tilt of the table 49 will be automatically changed to maintain the line 150 properly directed, this change in tilt being illustrated in Figures 11–15. In these figures the object photographed is assumed to be stationary, and the lines 470 represent the path (or extensions of the path) of the ball 47 and the lines 690 the path (or extensions of the path) of the ball 69. In these figures also the lines 150 represent the optic directional line of the table in the various angular positions of the latter, the angles included between the lines 150 being the parallax of the table. The positions 49$^a$, 49$^b$ and 49$^c$ of the table 49 are correspondingly indicated in Figures 11, 12 and 13 and the positions 49$^d$, 49$^e$ and 49$^f$ are correspondingly indicated in Figures 11, 14 and 15. In the former case the object photographed is at 91 (Figure 11) and in the latter case it is at 95. These figures make it clear that the forward tilt of the table is most at the mid-point and least at the extremities of the arc of oscillation, this being due to the difference in the distances between the balls 47 and 69 and the axis of oscillation. For the same reason, the table 49 will also turn askew upon the articulated parallelogram and the pillar 66, 72, as viewed in plan, this skewing being particularly illustrated in Figures 13 and 15. These tilting and skewing movements are caused when, but only when, the apparatus is not set for the photography of an object at infinite distance, by the facts that for all distances other than infinite distance the articulated parallelogram and the pillar 66, 72 are of different effective lengths, and that one is nearer than the other to the object to be photographed. In this way, the equivalent of the parallax of human vision is obtained and rotation of the handwheel 78 (which can readily be effected during the oscillation) will enable that parallax to be maintained during the progress of the exposure if the object photographed moves towards or away from the camera. If such movement of the object occurs and the handwheel 78 is correspondingly adjusted, there will be different movements of the table 49 during the oscillation (see Figure 9). For instance when the object photographed is at 89, the parallax angle is relatively large and the skewing of the table correspondingly great, but if the object moves further away to 90 and the handwheel 78 is correspondingly adjusted, the parallax angle and the skewing diminish. The operator is assumed to know the distance through which the object photographed moves towards or away from the camera, and by referring to the scale 80 will be able to impart the appropriate rotation to the handwheel 78 to adjust the length of the pillar 66, 72 in the manner necessary to maintain the optic directional line of the table properly directed upon the object. In the lower half of Figure 9, the movement of the table 49 is shown when the object remains stationary at 89. In the upper half of Figure 9, the various positions of the optic directional line 150 are shown during the movement of the object from 89 to 90 assuming that corresponding adjustments are made to the handwheel 78. Also in the upper half of Figure 9, the angular positions of the table during oscillation are shown, the positions 490 and 491 being occupied when the object is at 90 and the position 492 being occupied when the object is at 89. The engagement between the nut 71 and rod 72 ensures that the pillar 66, 72 remains operative to support the table 49 during the adjustment caused by rotation of the handwheel 78.

A reference to Figure 10 will enable the way in which the apparatus is used to be further understood. In this figure, the line 92 represents the main axis of oscillation, the line 93 is an imaginary line drawn from the axis of the trunnions 26 towards the table 49 at right-angles to the line 92, and the line 94 is drawn through the centre of the ball joint 47, also at right-angles to the line 92. The scale 30 is graduated in terms of the distance along the line 92 between the line 94 and the object photographed. For the photography of an object situated at 96, the setting of the plate 27 need not be changed from the infinity setting shown in full lines, but by rotation of the handwheel 78 the operator directs the optic directional line 150 on to the base of the object at 96. If, however, the object moves from 96 to 97, it is requisite for the operator to adjust the handwheel 78 and the plate 27 so that the lines 92 and 150 shall intersect at the base of 97. Corresponding adjustments to the handwheel 78 and the plate 27 will be needed if the object moves to 98.

As already described, the plane of the table 49 is above the line 150, and obviously the camera lens axis is still higher. This latter axis is shown at 99 in Figure 10 and it is parallel to the line 150. It intersects the object 96 at a point 960 above the base of the latter. The distance along the line 99 between the point 960 and the camera lens does not remain quite constant during the oscillation, even though the object 96 remains stationary. This is because (a) the forward tilt of the table 49 changes during the oscillation, and (b) as just mentioned, the table is offset from the parallax 150.

Figure 13:
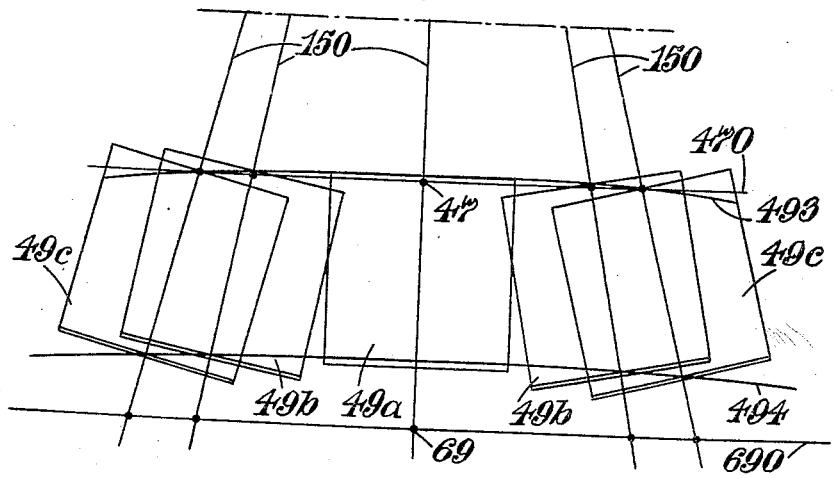
Figure 13 is a diagrammatic plan view corresponding to the part of Figure 11 which is in full lines.

In Figures 13 and 15 the lines 493 represent the paths (or extensions of the paths) of the mid-point of the front edge of the table 49 and the lines 494 represent the paths (or extensions of the paths) of the mid-point of the rear edge of the table 49. These lines 493 and 494 are not parallel to the lines 470 and 690 and it will be seen that the distance between the camera lens and the point 960 (Figure 10) is least at the mid-point of the oscillation and gradually increases (though only to a slight extent) towards the extremities of the oscillation. In actual practice, this increase is so slight as to be negligible; the focal depth of the camera lens is easily able to accommodate this increase. It may be here remarked that Figure 9 being on a small scale does not show the table 49 moving in paths such as delineated by the lines 493 and 494 aforesaid; also in this figure, and for the same reason, the apparent increase in the length of the table as it approaches the extremities of the oscillation is not shown.

As already indicated above, instead of mounting the camera upon the table 49, a reflector may be mounted upon the latter. In this arrangement, the camera would be mounted to one side and not oscillated, and the reflector would be so situated upon the table 49 as to reflect light from the object to be photographed to the camera. In the construction shown in Figures 16 and 17 the axis of the camera 100 is at right-angles to the axis of oscillation of the articulated parallelogram and there is mounted on the table 49 a reflector 101 which is at 45° to these two axes. In this case the film could be fed to the camera with the sensitized surface in the opposite setting with respect to the camera lens to that which would be adopted if the camera were directly facing the object to be photographed. If the film is placed in the camera in the normal way, it would have to be put through the projector with the sensitized surface facing the screen.

In the construction shown in Figure 18 the camera 100 has combined with it a second reflector 102 to pick up the light coming from the first reflector 101 and transmit it to the camera axis. In such an arrangement the camera 100 would lie with its axis parallel to the axis about which the articulated parallelogram is oscillated.

By the use of apparatus according to the present invention films of very realistic appearance will be obtainable and there will be no appreciable effect of the unit frames or pictures with respect to the length of the film. Adjustment in the forward tilting of the table can readily be made during the progress of the exposure as this is found necessary.

It is to be understood that the invention is not restricted to the precise constructional details set forth.

I claim:

1. Apparatus for use in taking cinematograph images, comprising a table for supporting the receiving member for the image-forming rays passing to the camera a horizonal platform on which the table is supported, the platform being roatable about its vertical axis and tiltable about its horizontal axis, means interposed between the platform and the table for oscillating said table bodily through an arc while maintaining the parallax of the table intersecting the axis of said oscillation at the location of the object photgraphed, means connected between the platform and the table for preventing sideways tilting of the table during the oscillation through said arc, means connected to the platform and to the table for adjusting the forward tilt of the table to angles appropriate to the distances between the apparatus and the object photographed, said adjusting means being adapted to support one end of the table during the progress of the adjustment the length of said adjustment means being adjustable so that the operator may effect the said adjustment during the oscillation of the table.

2. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table inersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and one of which pillars is formed of two elements movable endwise, the one relatively to the other, to adjust the operative length of that pillar, with means which interconnect said two elements throughout the adjustment and maintain the pillar operative to support the table during the progress of the adjustment and enable the operator to alter the operative length of said pillar relatively to the other pillar and thus alter the forward tilt of the table during the oscillation of the mounting.

3. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and one of which pillars comprises a screwed rod, a sleeve surrounding the rod and a nut in the sleeve and engaging the threads in the rod, which rod, sleeve and nut permit the operative length of that pillar to be adjusted and maintain the pillar operative to support the table during the progress of the adjustment and enable the operator to alter the operative length of said pillar relatively to the other pillar and thus alter the forward tilt of the table during the oscillation of the mounting.

4. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and one of which pillars comprises a screwed rod, a sleeve surrounding the rod and carrying part of a ball and socket joint constituting one of the aforesaid universal joints, and a nut in the sleeve and engaging the threads in the rod, which rod, sleeve and nut permit the operative length of that pillar to be adjusted and maintain the pillar operative to support the table during the progress of the adjustment and enable the operator to alter the operative length of said pillar relatively to the other pillar and thus alter the forward tilt of the table during the oscillation of the mounting.

5. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and one of which pillars comprises a screwed rod, a sleeve surrounding the rod, a nut carried in the sleeve and engaging the threads in the rod, a handwheel secured to said rod below the sleeve, and a second sleeve reaching upwardly from the handwheel to serve as an oil-retainer around the first mentioned sleeve, which rod, first mentioned sleeve and nut permit the operative length of that pillar to be adjusted and maintain the pillar operative to support the table during the progress of the adjustment and enable the operator to alter the operative length of said pillar relatively to the other pillar and thus alter the forward tilt of the table during the oscillation of the mounting.

6. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and one of which pillars comprises a screwed rod, a sleeve surrounding the rod, a nut carried in the sleeve and engaging the threads in the rod, a handwheel secured to said rod below the sleeve, and a second sleeve reaching upwardly from the handwheel around the first mentioned sleeve to serve as an indicator to be read in conjunction with an exposed part of the first mentioned sleeve during the adjustment in the length of the pillar, which rod, first mentioned sleeve and nut permit the operative length of that pillar to be adjusted and maintain the pillar operative to support the table during the progress of the adjustment and enable the operator to alter the operative length of said pillar relatively to the other pillar and thus alter the forward tilt of the table during the oscillation of the mounting.

7. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, two universal joints appropriated one to each pillar to connect that pillar to the table, and additional bearing elements, one on each side of one of the universal joints, which bearing elements are shaped and proportioned to maintain contact with the table during alteration in the forward tilt of the latter, one of which pillars is a "parallel motion" articulated structure having the shape of a parallelogram which supports the table against sideways tilting during oscillation through the said arc, and one of which pillars is formed of two elements movable endwise the one relatively to the other to adjust the operative length of that pillar, with means which interconnect said two elements throughout the adjustment and maintain the pillar operative to support the table during the progress of the adjustment and enable the operator to alter the operative length of said pillar relatively to the other pillar and thus alter the forward tilt of the table during the oscillation of the mounting.

8. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect the pillar to the table, one of which pillars is a "parallel motion" articulated structure having the shape of a parallelogram which supports the table against sideways tilting during oscillation through the said arc, and one of which pillars embodies means for adjusting its operative length relatively to the other pillar to alter the forward tilt of the table, and one of which pillars is movable towards and away from the other to accommodate changes in the forward tilt of the table.

9. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and the second of which pillars embodies means for adjusting its operative length relatively to the "parallel motion" pillar to alter the forward tilt of the table, and also embodies hinging means permitting its outer extremity to move towards and away from the "parallel motion" pillar when the length of the second pillar is adjusted.

10. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, and the second of which pillars embodies means for adjusting its operative length relatively to the "parallel motion" pillar to alter the forward tilt of the table, and also embodies an universal joint, which is additional to the two universal joints aforesaid, which third universal joint permits the second pillar to oscillate with the "parallel motion" pillar and also permits the outer extremity of the second pillar to move towards and away from the "parallel motion" pillar when the length of the second pillar is adjusted.

11. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, one of which pillars is a "parallel motion" articulated structure having the shape of a parallelogram which supports the table against sideways tilting during oscillation through the said arc, and the second of which pillars embodies means for adjusting its operative length relatively to the "parallel motion" pillar to alter the forward tilt of the table, two universal joints appropriated one to each pillar to connect that pillar to the table, a bracket carrying the second pillar and pivoted to oscillate with the "parallel motion" pillar and jaws near the outer extremity of said bracket embracing the second pillar and causing it to oscillate with the "parallel motion" pillar but permitting the outer extremity of the second pillar to move towards and away from the "parallel motion" pillar when the length of the second pillar is adjusted.

12. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, each of the two sides of which articulated structure consists of a stiff braced frame having axially aligned bearings widely spaced along the axis of oscillation of the structure side, and one of which pillars embodies means for adjusting its operative length relatively to the other pillar to alter the forward tilt of the table.

13. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, one of which pillars is a "parallel motion" articulated structure having the shape of a parallelogram which supports the table against sideways tilting during oscillation through the said arc, each of the two sides of which articulated structure consists of a stiff braced frame having axially aligned bearings widely spaced along the axis of oscillation of the structure side, and the second of which pillars embodies means for adjusting its operative length relatively to the "parallel motion" pillar to alter the forward tilt of the table, two universal joints appropriated one to each pillar to connect that pillar to the table, a bracket carrying the second pillar and pivoted to oscillate with the "parallel motion" pillar about an axis lying between and parallel to and in the plane of the axes of pivoting of the two sides of the articulated structure, means to oscillate the said bracket and means to transmit the oscillatory effort from the bracket to the articulated structure.

14. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, and two universal joints appropriated one to each pillar to connect that pillar to the table, one of which pillars is a "parallel motion" articulated structure having the shape of a parallelogram which supports the table against sideways tilting during oscillation through the said arc, one of which pillars embodies means for adjusting its operative length relatively to the other pillar to alter the forward tilt of the table, which oscillatable mounting is extended past the axis of the said arc for the purpose of balancing and also comprises a balance weight, means for mounting said balance weight on said extension of the mounting, and a connection between said weight and the means for varying the operative length of the said adjustable pillar whereby the weight is so controlled by said adjusting means as to move appropriately towards and away from the axis of said arc during the adjustment of the operative length of the said pillar, so as to balance changes in the loading of the mounting due to the said adjustment.

15. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, one of which pillars is a "parallel motion" articulated structure having the shape of a parallelogram which supports the table against sideways tilting during oscillation through the said arc, and the second of which pillars embodies means for adjusting its operative length relatively to the "parallel motion" pillar to alter the forward tilt of the table, two universal joints appropriated one to each pillar to connect that pillar to the table, a bracket carrying the second pillar and pivoted to oscillate with the "parallel motion" pillar, jaws near the outer extremity of said bracket embracing the second pillar and causing it to oscillate with the "parallel motion" pillar but permitting the outer extremity of the second pillar to move towards and away from the "parallel motion" pillar when the length of the second pillar is adjusted, which bracket is extended past the axis of the said arc and formed in said extension on a slideway whereof the length is directed forwards the axis of said arc, a balance weight received in said slideway, and a connection between said weight and the means for varying the operative length of the second pillar whereby the weight is so controlled by said adjusting means as to move appropriately towards and away from the axis of said arc during the adjustment of the operative length of the second pillar, so as to balance changes in the loading of the mounting due to the said adjustment.

16. Apparatus for use in taking cinematograph images, comprising a table for supporting the receiving member for the image-forming rays passing to the camera, in combination with a composite oscillatable mounting for said table adapted to permit the forward tilt of the table to be altered to angles appropriate to the distances between the apparatus and the object photographed, and adapted to oscillate the table bodily through an arc about an axis while maintaining the optic directional line of the table intersecting the said axis of oscillation at a fixed point which is the location of the object photographed, which mounting comprises two pillars spaced apart along said axis of oscillation, one of which pillars is a "parallel motion" articulated structure having the shape of a parallelogram which supports the table against sideways tilting during oscillation through the said arc, and the second of which pillars comprises a screwed rod which is extended past the axis of said arc, a sleeve surrounding part of the length of the rod and carrying part of a ball and socket joint constituting one of the aforesaid universal joints, and a nut in the sleeve and engaging the threads in the rod, which rod, sleeve and nut permit the operative length of the second pillar to be adjusted and maintain that pillar operative to support the table during the progress of the adjustment and enable the operator to alter the operative length of the second pillar relatively to the "parallel motion" pillar and thus alter the forward tilt of the table during the oscillation of the mounting, two universal joints appropriated one to each pillar to connect that pillar to the table, a bracket carrying the second pillar and pivoted to oscillate with the "parallel motion" pillar, jaws near the outer extremity of said bracket embracing the second pillar and causing it to oscillate with the "parallel motion" pillar but permitting the outer extremity of the second pillar to move towards and away from the "parallel motion" pillar when the length of the second pillar is adjusted, which bracket is extended past the axis of the said arc and formed in said extension as a slideway whereof the length is directed towards the axis of said arc, and a balance weight received in said slideway and engaging the screw threads in the said extension of the screwed rod in such manner as to move appropriately towards and away from the axis of said arc during the adjustment of the operative length of the second pillar, so as to balance changes in the loading of the mounting due to the said adjustment.

TED MAXWELL HARVEY.